D. REYNOLDS.
Cotton and Hay-Presses.
No. 143,641. Patented Oct. 14, 1873.
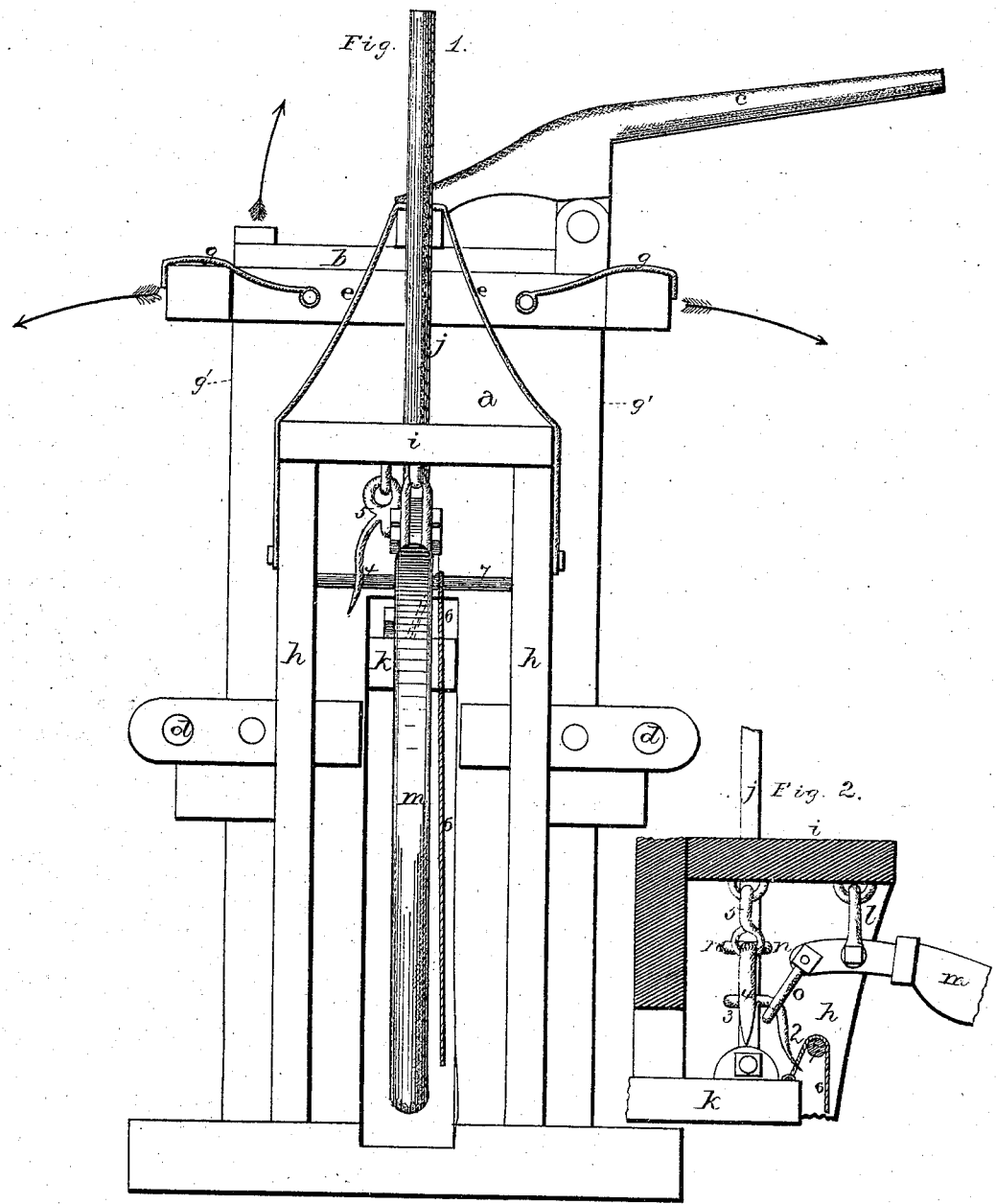
Witnesses.
Wm Freeman
W. F. Kendig
Inventor.
David Reynolds

UNITED STATES PATENT OFFICE.

DAVID REYNOLDS, OF PROSPECT, MARYLAND.

IMPROVEMENT IN COTTON AND HAY PRESSES.

Specification forming part of Letters Patent No. 143,641, dated October 14, 1873; application filed September 10, 1873.

*To all whom it may concern:*

Be it known that I, DAVID REYNOLDS, of Prospect, in the county of Hartford and State of Maryland, have invented certain new and useful Improvements in Cotton and Hay Presses; and do hereby declare the following to be a full, clear, and exact description of the invention, such as will enable others skilled in the art to which it pertains to make and use it, reference being had to the accompanying drawings, which form part of this specification.

The nature of my invention relates to an improvement in hay and cotton presses; and it consists in the arrangement and combination of parts, which will be more fully described hereafter.

Figure 1 is an end view of my invention. Fig. 2 is a detail view of the same.

$a$ represents the body of the press, constructed in the usual manner, and which is provided with a door, $b$, upon top, to which is secured a hand-lever, $c$, for opening and closing it, the door being held shut, while baling, by the loop $e$. Pivoted at the points $d$, on each side, are two additional doors, $g'$, which swing outward and downward, to allow the bale to be taken out after it is formed, and which doors are held shut by the hooks $g$. To each end of the frame $a$ is secured a frame consisting of the two side pieces $h$ and cap-piece $i$. Through this cap-piece passes the round rod $j$, to which the follower $k$ is secured; and to its under side is hung the loop $l$, in which the lever $m$ is fulcrumed, and the friction ring or clutch $n$, by which the rod $j$ is held in position. Passing over the rod are two friction rings or clutches, each of which has a downwardly-projecting arm, which not only serve to catch over suitable supporting-links, and thus support the rings in position, but to loosen the hold of the rings upon the rod, so that it will slip freely down, lowering the follower, by means of the cord and pulley, to the bottom of the frame again. To the end of each of the operating-levers $m$ is secured a loop, $o$, which catches under the arm 2 of the lifting ring or catch 3. The ring $n$ has also an arm, 4, which catches in an eye formed in the end of the supporting rod or loop 5.

The outer end of the levers $m$ being raised upward, the ring 3 slides down upon the rod, and then, when the lever is depressed, the ring bites into the side of the rod and raises the rod upward, carrying the follower $k$ upward with it. The moment the ring descends for another lift the upper ring $n$ catches hold of the rod and prevents it from descending. When it is desired to let the follower descend to the bottom of the press again, after the bale has been removed the lower ends of the two arms 2 4 are pressed together, when both rings instantly release their hold upon the rod, and the follower falls. In order to prevent the follower from falling too heavily, I attach a rope or chain, 6, to it, and pass it over the roller 7 down within reach of the operator.

Having thus described my invention, I claim—

The hay and cotton press consisting of the frame $a$, having the doors $b$ $g'$, levers $c$ $m$, loops $l$ $o$, rings $n$ 3, link 5, arms 2 4, follower $k$, roller 6, and rope 7, the parts all being combined and arranged for operation substantially as shown and described.

In testimony that I claim the foregoing I have hereunto set my hand this 5th day of September, 1873.

DAVID REYNOLDS.

Witnesses:
F. A. LEHMANN,
W. G. KENDIG.